(12) United States Patent
Otsuka (10) Patent No.: US 11,912,208 B2
(45) Date of Patent: Feb. 27, 2024

(54) INTERIOR TRIM FOR AUTOMOBILES (71) Applicant: KASAI KOGYO CO., LTD., Kanagawa (JP)

(72) Inventor: Hiroshi Otsuka, Chigasaki (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 790 days.

(21) Appl. No.: 17/052,130

(22) PCT Filed: Sep. 25, 2018

(86) PCT No.: PCT/JP2018/035327
§ 371 (c)(1),
(2) Date: Oct. 30, 2020

(87) PCT Pub. No.: WO2020/065704
PCT Pub. Date: Apr. 2, 2020

(65) Prior Publication Data
US 2021/0138975 A1 May 13, 2021

(51) Int. Cl.
*B60R 13/02* (2006.01)
*B60R 21/216* (2011.01)

(52) U.S. Cl.
CPC ........ *B60R 13/0237* (2013.01); *B60R 21/216* (2013.01); *B60R 13/02* (2013.01);
(Continued)

(58) Field of Classification Search
CPC . B60R 13/02; B60R 13/0206; B60R 13/0237; B60R 21/216; B60R 2013/0281; B60R 2013/0287
(Continued)

(56) References Cited

U.S. PATENT DOCUMENTS 6,394,695 B1 * 5/2002 Chausset ................. F16B 5/065
403/397
8,480,120 B1 7/2013 Fukuda et al.
(Continued)

FOREIGN PATENT DOCUMENTS

CN 1558843 A 12/2004
EP 1003976 A1 5/2000
(Continued)

OTHER PUBLICATIONS

International Search Report for International Application No. PCT/JP2018/035327 dated Nov. 20, 2018, Japan, 2 pages.

*Primary Examiner* — Amy R Weisberg
*Assistant Examiner* — Dana D Ivey
(74) *Attorney, Agent, or Firm* — United IP Counselors, LLC (57) ABSTRACT

An automobile interior trim includes an interior trim body including a designed surface and a back surface thereof and attached to a vehicle body panel, a strap attached to the back surface of the interior trim body, a metal clip attached to the distal end of the strap, and a rib in a form of standing up from the back surface of the interior trim body. A part included in the metal clip and positioned on the distal end side of the metal clip is formed as pinching portions capable of being opened and closed. The rib functions so as to temporarily hold the metal clip by being pinched by the pinching portions of the metal clip.

4 Claims, 9 Drawing Sheets

(52) U.S. Cl.
CPC ... *B60R 13/0206* (2013.01); *B60R 2013/0281* (2013.01); *B60R 2013/0287* (2013.01)

(58) Field of Classification Search
USPC ........................................................ 296/1.08
See application file for complete search history.

(56) References Cited

U.S. PATENT DOCUMENTS

| | | | |
|---|---|---|---|
| 9,821,747 B2* | 11/2017 | Benedetti | F16B 21/075 |
| 2002/0117835 A1 | 8/2002 | Schneider | |
| 2004/0094938 A1 | 5/2004 | Ryu | |
| 2004/0245798 A1 | 12/2004 | Tokunaga | |
| 2014/0225355 A1 | 8/2014 | Risdale | |

FOREIGN PATENT DOCUMENTS

| | | |
|---|---|---|
| EP | 1432598 A1 | 6/2004 |
| JP | 2002-519591 A | 7/2002 |
| JP | 2003-095033 A | 4/2003 |
| JP | 2004-168278 A | 6/2004 |
| JP | 2013-052788 A | 3/2013 |
| JP | 2014-122030 A | 7/2014 |
| KR | 10-0563780 B1 | 3/2006 |
| KR | 10-2014-0058580 A | 5/2014 |
| WO | 1999/067542 A1 | 12/1999 |
| WO | 2003/029051 A1 | 4/2003 |
| WO | 2013/032561 A1 | 3/2013 |
| WO | 2013/035591 A1 | 3/2013 |

* cited by examiner

L1, L2: PINCHING WIDTH    L2 < L1
t1, t2: THICKNESS OF RIB    t2 = t1

INTERIOR TRIM FOR AUTOMOBILES

CROSS-REFERENCE TO RELATED APPLICATIONS

This application is a National Stage Entry application of PCT International Application No. PCT/JP2018/035327, filed on Sep. 25, 2018, the entire contents of both of which are hereby incorporated by reference.

BACKGROUND

1. Technical Field

The present invention relates to an automobile interior trim attached to a vehicle body panel of an automobile, such as a door panel, a front pillar, or a rear pillar, and is particularly suitable for preventing a designed surface from being damaged at the time of transporting or handling the automobile interior trim.

2. Description of the Background

This type of conventional interior trim for an automobile includes, as a specific constituent component thereof, an interior trim body attached to a vehicle body panel, and a front surface of the interior trim body is formed as a designed surface. (For example, Japanese Patent Application Laid-open Publication No. 2004-168278)

The conventional interior trim for an automobile is configured such that the interior trim body is detached from the vehicle body panel when a well-known air bag as standard equipment for an automobile is developed.

The conventional interior trim for an automobile includes a strap and a metal clip as means for keeping a state where the interior trim body having been detached as described above is connected to the vehicle body panel. The strap is attached to a back surface of the interior trim body, and the metal clip is attached to the distal end of the strap.

In the conventional interior trim for an automobile, in a state where the interior trim is attached to the vehicle body panel, one end (proximal end) of the strap is fixed to the back surface of the interior trim body, and the metal clip is attached to the vehicle body panel. For this reason, when the interior trim body is detached from the vehicle body panel due to development of the air bag, the detached interior trim body can be kept connected to the vehicle body panel by the strap 3.

However, concerning the conventional interior trim for an automobile, until just before the metal clip is attached to the vehicle body panel, the metal clip is in a free state without being temporarily held. For this reason, there is a problem that at the time of transporting or handling the automobile interior trim for example, the metal clip turns around to the designed surface of the interior trim body and contacts or collides with the designed surface, and thus, a defective product due to damage of the designed surface such as a scratch on the designed surface of the interior trim body tends to frequently occur.

BRIEF SUMMARY

The present invention has been made to solve the above-described problem. An object of the present invention is to provide an automobile interior trim suitable for preventing damage of a designed surface at the time of transporting or handling the automobile interior trim.

In order to accomplish the object, the present invention includes an interior trim body, a strap, a metal clip, and a rib. The interior trim body includes a designed surface and a back surface thereof, and is attached to a vehicle body panel. The strap is attached to the back surface of the interior trim body. The metal clip is attached to the distal end of the strap. The rib is formed so as to stand up from the back surface of the interior trim body. A part included in the metal clip and positioned on the distal end side of the metal clip is formed as pinching portions capable of being opened and closed. The rib functions as means for temporarily holding the metal clip by being pinched by the pinching portions of the metal clip.

In the present invention described above, the automobile interior trim further includes a contact portion arranged at the back surface of the interior trim body. The contact portion is configured to contact against the vehicle body panel. The present invention described above may be set such that the proximal end of the metal clip is arranged at a position higher than the contact portion in a state of the temporary holding.

In the present invention described above, the rib may be formed in a shape curved in a width direction of the pinching portions to function as means for enhancing temporary holding force of the metal clip on the rib.

As described above, the present invention includes, as a specific constituent of an automobile interior trim, the rib in the form of standing up from the back surface of the interior trim body, and is configured such that this rib functions as the means for temporarily holding the metal clip by being pinched by the pinching portions of the metal clip. For this reason, at the time of transporting or handling the automobile interior trim, the metal clip is temporarily held near the rib, and thereby, flapping of the metal clip can be prevented. Thus, it is possible to provide an automobile interior trim suitable for effectively preventing, at the time of transporting or handling the automobile interior trim, damage of the designed surface such as a scratch on the designed surface caused by contacting of the metal clip with the designed surface.

DETAILED DESCRIPTION

Hereinafter, the best mode for carrying out the present invention is described in detail with reference to the attached drawings.

Figure 1:
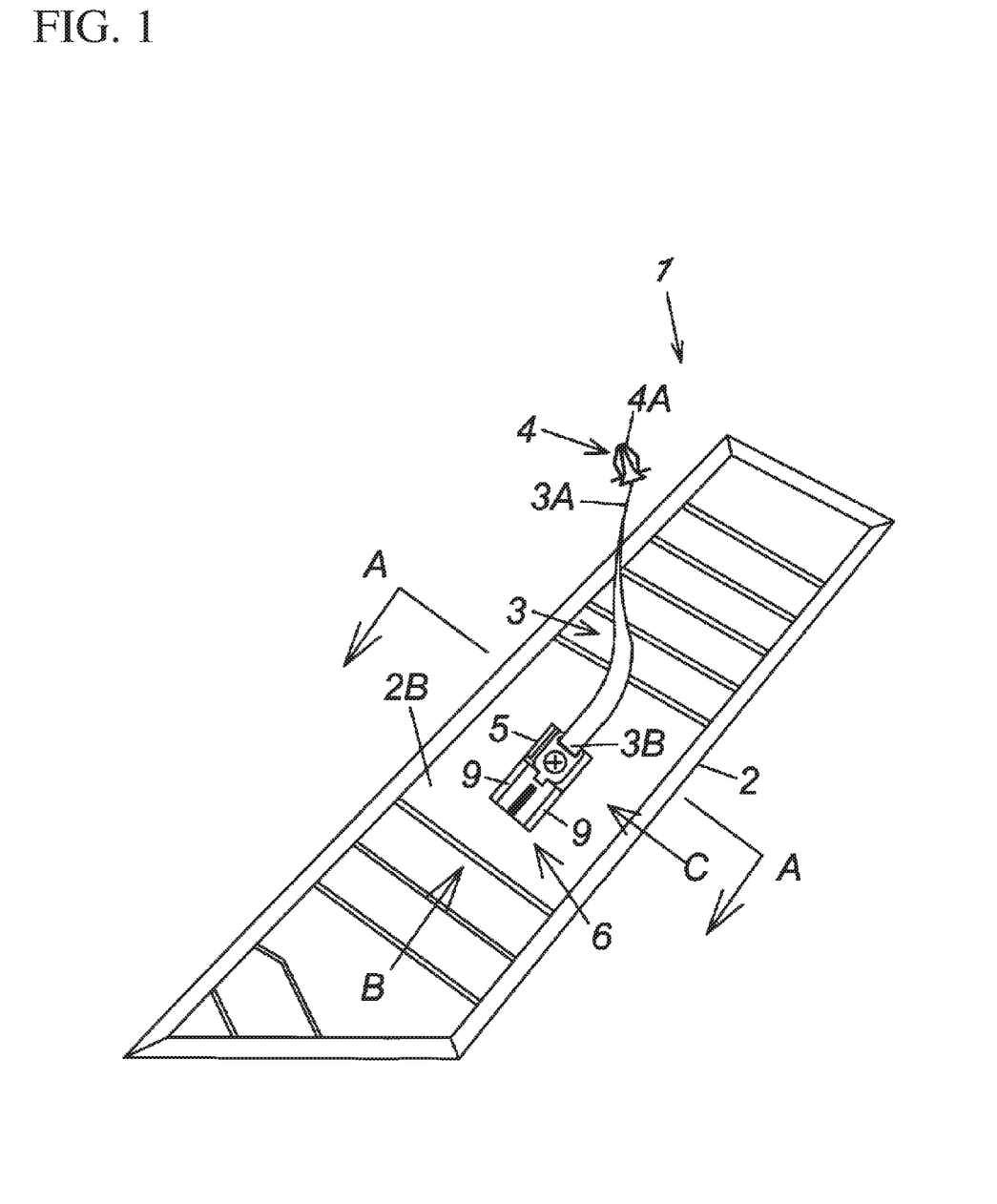
FIG. 1 is a schematic view of a back surface of an automobile interior trim to which the present invention is applied.
Figure 2:
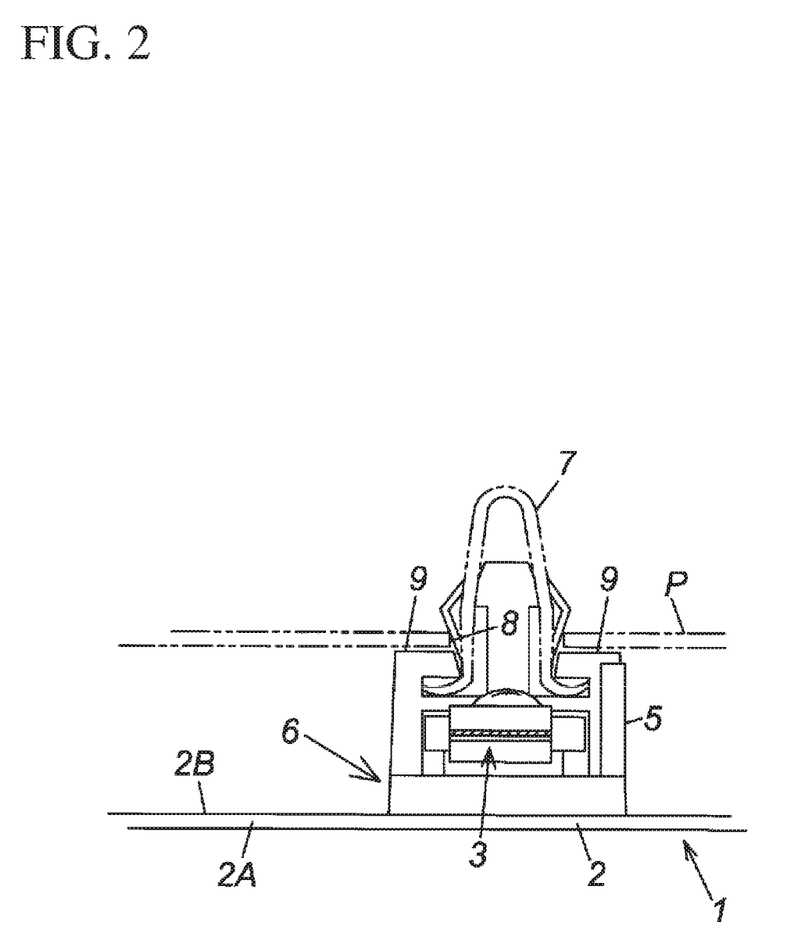
FIG. 2 is a view taken along the arrow A in FIG. 1.
Figure 3:
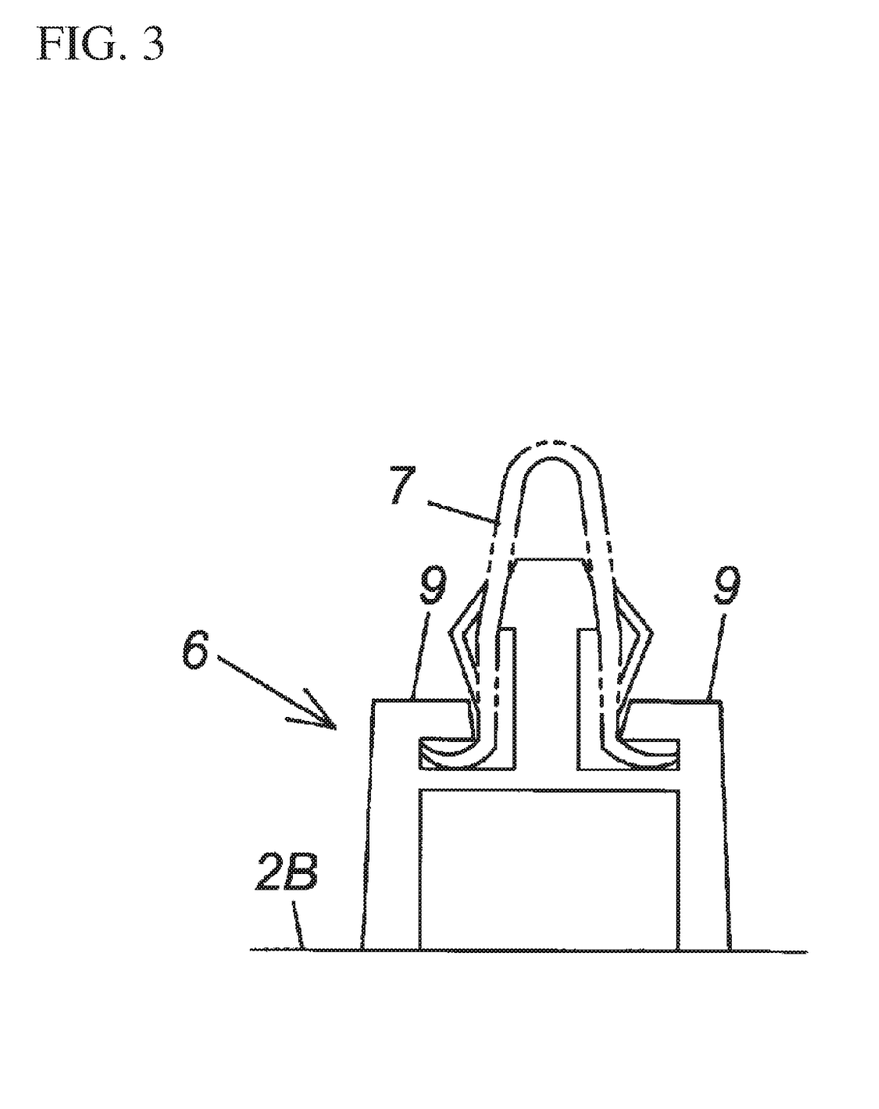
FIG. 3 is a view taken along the arrow B in FIG. 1.
Figure 4:
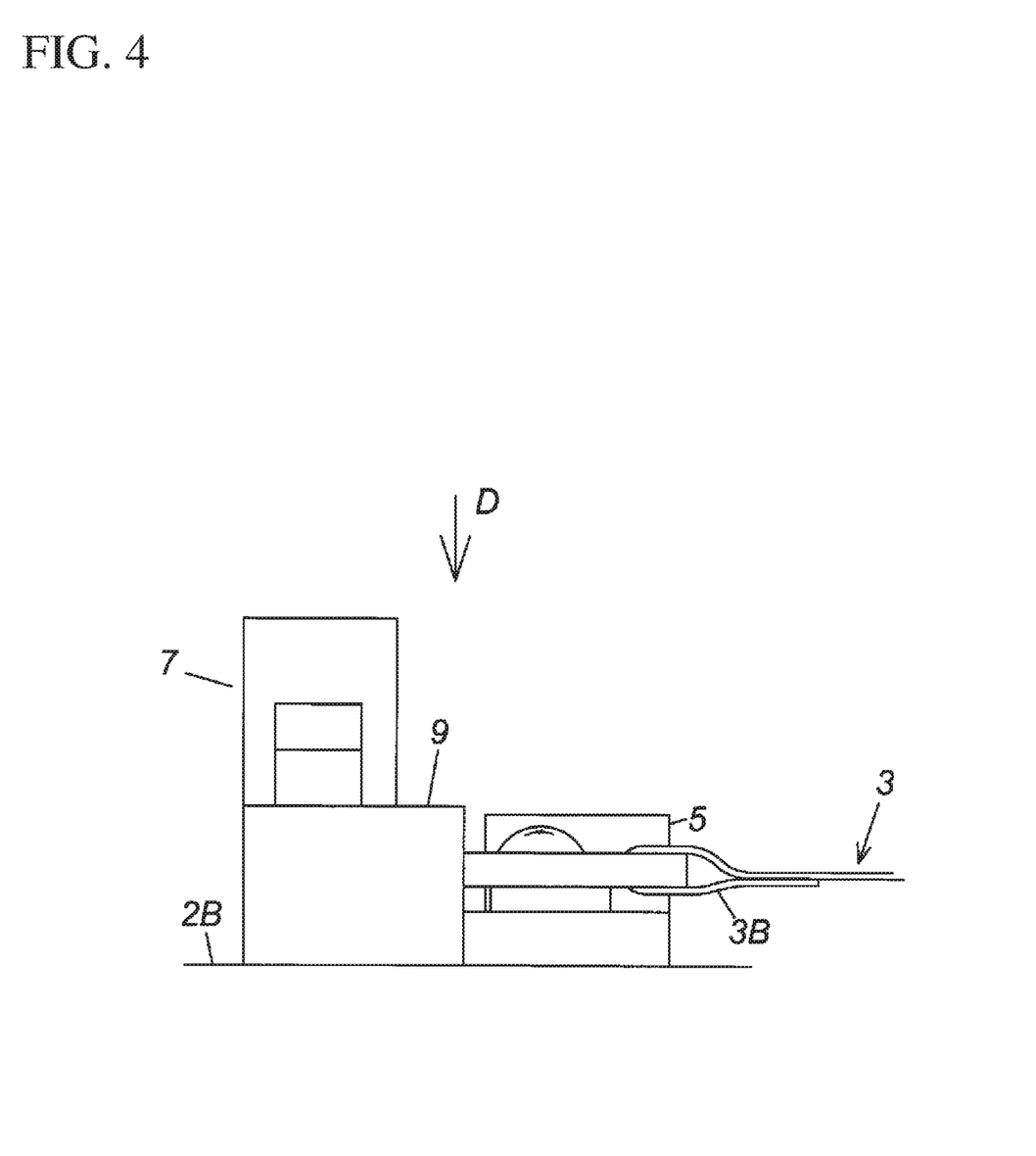
FIG. 4 is a view taken along the arrow C in FIG. 1.
Figure 5:
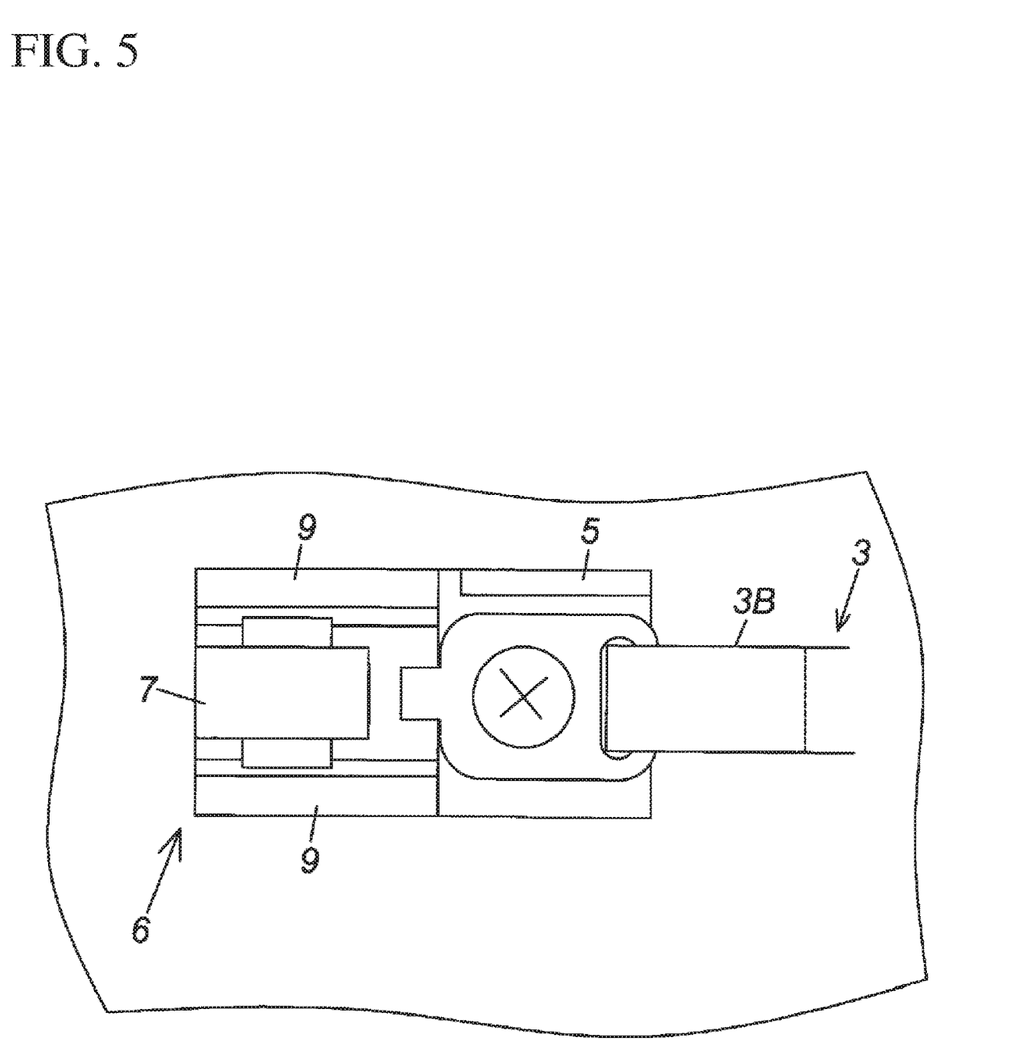
FIG. 5 is a view taken along the arrow D in FIG. 4.

FIG. 1 is a schematic view of a back surface of an automobile interior trim to which the present invention is applied. FIG. 2 is a view taken along the arrow A in FIG. 1. FIG. 3 is a view taken along the arrow B in FIG. 1. FIG. 4 is a view taken along the arrow C in FIG. 1. FIG. 5 is a view taken along the arrow D in FIG. 4.

Referring to FIG. 1 to FIG. 5, the automobile interior trim 1 of FIG. 1 is a front pillar garnish attached to a vehicle body panel (specifically, a front pillar) of an automobile. The automobile interior trim 1 includes the following specific components thereof: (1) an interior trim body 2 including a designed surface 2A and a back surface 2B thereof and attached to the vehicle body panel P; (2) a strap 3 attached to the back surface 2B of the interior trim body 2; (3) a metal clip 4 attached to the distal end of the strap 3; and (4) a rib 5 in a form of standing up from the back surface 2B of the interior trim body 2.

The interior trim body 2 is configured so as to include, for example, a resin core member formed into a required shape corresponding to a shape of the vehicle body panel P, and a skin member pasted to a surface of the resin core member. The interior trim body 2 is arranged such that with the interior trim body 2 being attached to an inner surface of the vehicle body panel P (refer to FIG. 2), the designed surface 2A of the interior trim body 2 is positioned on an interior side of the automobile, and the back surface 2A faces the vehicle body panel P.

According to the automobile interior trim 1 of FIG. 1, in a mode adopted as specific means for attaching the interior trim body 2 to the vehicle body panel P, a clip support base 6 is provided at the back surface 2A of the interior trim body 2, an attachment clip 7 (refer to FIG. 2 to FIG. 5) is installed at the clip support base 6, and the installed attachment clip 7 is press-fitted into a clip attachment hole 8 of the vehicle body panel P. However, the specific means is not limited to this mode.

At the back surface 2B of the interior trim body 2, a contact portion 9 (refer to FIG. 2 to FIG. 5) is provided, the contact portion 9 being allowed to contact against the vehicle body panel P. Contacting of the contact portion 9 against the vehicle body panel P as illustrated in FIG. 2 sets relative position and interval between the vehicle body panel P and the automobile interior trim 1 so as to become desired values.

Positions, the number, sectional shapes, and the like of the contact portions 9 at the back surface 2A of the interior trim body 2 can be appropriately changed in accordance with necessity. In the automobile interior trim 1 of FIG. 1, the one contact portion 9 described above is provided on each of both sides of the clip support base 6. However, without limitation to this, the contact portion 9 can be provided at a place other than the clip support base 6, within an area of the back surface 2A of the interior trim body, and the number and shapes of the contact portions 9 can be also appropriately changed in accordance with necessity.

When the interior trim body 2 is detached from the vehicle body panel P due to development of an un-illustrated air bag, the strap 3 functions as means for keeping the detached interior trim body 2 connected to the vehicle body panel P.

In the automobile interior trim 1 of FIG. 1, structures adopted as a specific configuration for implementing such a function includes a structure in which a part included in the strap 3 and positioned on the side of one end (proximal end) 3B of the strap 3 is screw-fixed via a stopper to the back surface of the interior trim body 2, and the above-described metal clip 4 is provided at a part included in the strap 3 and positioned on the side of the opposite end (distal end) 3A of the strap 3, and a structure in which the metal clip 4 is capable of pinching an un-illustrated protrusion at the vehicle body panel P. Note that the one end 3B of the strap 3 may be fixed to the back surface 2A of the interior trim body 2 by another means other than the screw fixation.

Figure 6A:
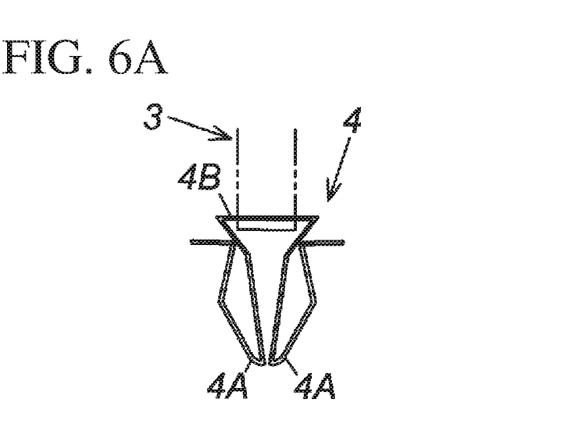
FIG. 6A is a front view of a metal clip adopted in the automobile interior trim of FIG. 1.
Figure 6B:
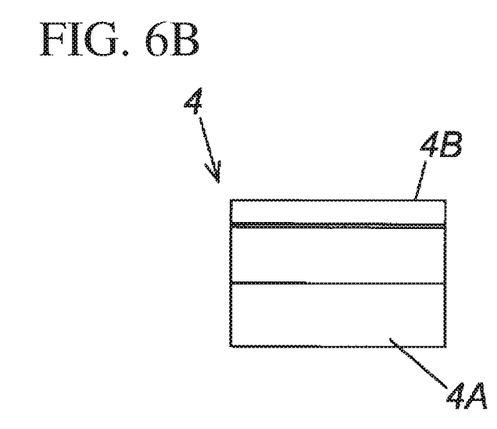
FIG. 6B is a left side view of the metal clip.
Figure 6C:
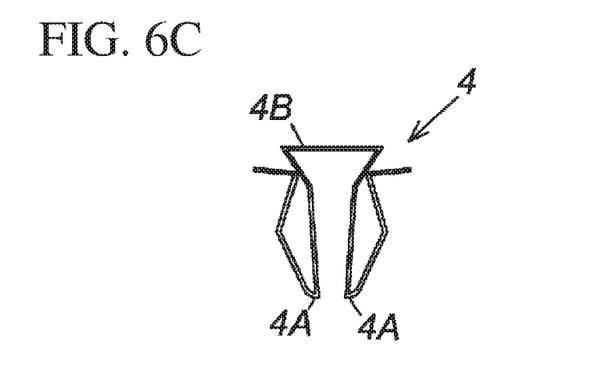
FIG. 6C is an illustration of a state where pinching portions of the metal clip are opened.

FIG. 6A is a front view of the metal clip adopted in the automobile interior trim of FIG. 1, FIG. 6B is a left side view thereof, and FIG. 6C is an illustration of a state in which pinching portions of the clip are opened.

Referring to FIG. 6A, FIG. 6B, and FIG. 6C, a part included in the metal clip 4 and positioned on the distal end side of the metal clip 4 is formed as the pinching portions 4A capable of being opened and closed, and in work of attaching the interior trim body 2 to an inner surface of the vehicle body panel P, the pinching portions 4A are made to pinch the un-illustrated protrusion at the vehicle body panel P, and thereby, the metal clip 4 is attached to the vehicle body panel P. In the automobile interior trim 1 of FIG. 1, an iron clip is adopted as this type of metal clip 4, but a clip made of metal other than iron may be adopted.

In the automobile interior trim 1 of FIG. 1, as described above, the one end (proximal end) 3B of the strap 3 is fixed to the back surface 2A of the interior trim body 2, and the metal clip 4 is attached to the vehicle body panel P. For this reason, when the interior trim body 2 is detached from the vehicle body panel P due to development of the un-illustrated air bag, the strap 3 can keep the detached interior trim body 2 connected to the vehicle body panel P.

As described above, the strap 3 functions as the means for keeping the interior trim body 2 connected to the vehicle body panel P, and accordingly, it is desirable that the strap 3 is made of a relatively strong raw material. A length of the strap 3 can be appropriately changed in accordance with necessity.

The rib 5 functions as means for temporarily holding the metal clip 4 by being pinched by the pinching portions 4A of the metal clip 4. The rib 5 can be formed of resin integrally with the interior trim body 2.

A part included in the metal clip 4 and positioned on the side of the proximal end 4B of the metal clip 4 is nipped by a hand and released from the hand, and thereby, the pinching portions 4A of the metal clip 4 are opened as illustrated in FIG. 6C and closed as illustrated in FIG. 6A. Accordingly, this opening and closing enables the pinching portions 4A of the metal clip 4 to pinch the rib 5.

Concerning a specific forming position of the rib 5, the rib 5 is provided near the clip support base 6 in the automobile interior trim 1 of FIG. 1, but there is no limitation to this. A specific forming position of the rib 5 can be appropriately changed in accordance with necessity.

The metal clip 4 is temporarily held by the rib 5 in a period until just before the interior trim body 2 is attached to the vehicle body panel P, the period including the time of transporting the automobile interior trim 1 and the time of handling the automobile interior trim 1. Then, in work of attaching the interior trim body 2 to the vehicle body panel P, the temporary holding of the metal clip 4 is released. This releasing of the temporary holding is made by opening the pinching portions 4A of the metal clip 4 as illustrated in FIG. 6C.

After the temporary holding of the metal clip 4 is released, normally, a working person attaches and fixes the metal clip 4 to the vehicle body panel P, but it is assumed that due to carelessness or the like of a working person, there is occurrence of a working mistake (hereinafter, referred to as "metal clip attaching mistake") in which the working person forgets to release the temporary holding of the metal clip 4 and to attach the metal clip 4 to the vehicle body panel P.

In the case where a metal clip attaching mistake occurs, when the interior trim body 2 is detached from the vehicle body panel P due to development of the un-illustrated air bag, the strap 3 does not function, and the detached interior trim body 2 cannot be kept connected to the vehicle body panel P. The metal clip 4 is arranged between the back surface 2A of the interior trim body 2 and the vehicle body panel P. For this reason, after the interior trim body 2 is attached to the vehicle body panel P, the metal clip 4 cannot be visually checked from an outside, and it is difficult to find a metal clip attaching mistake.

Figure 7:
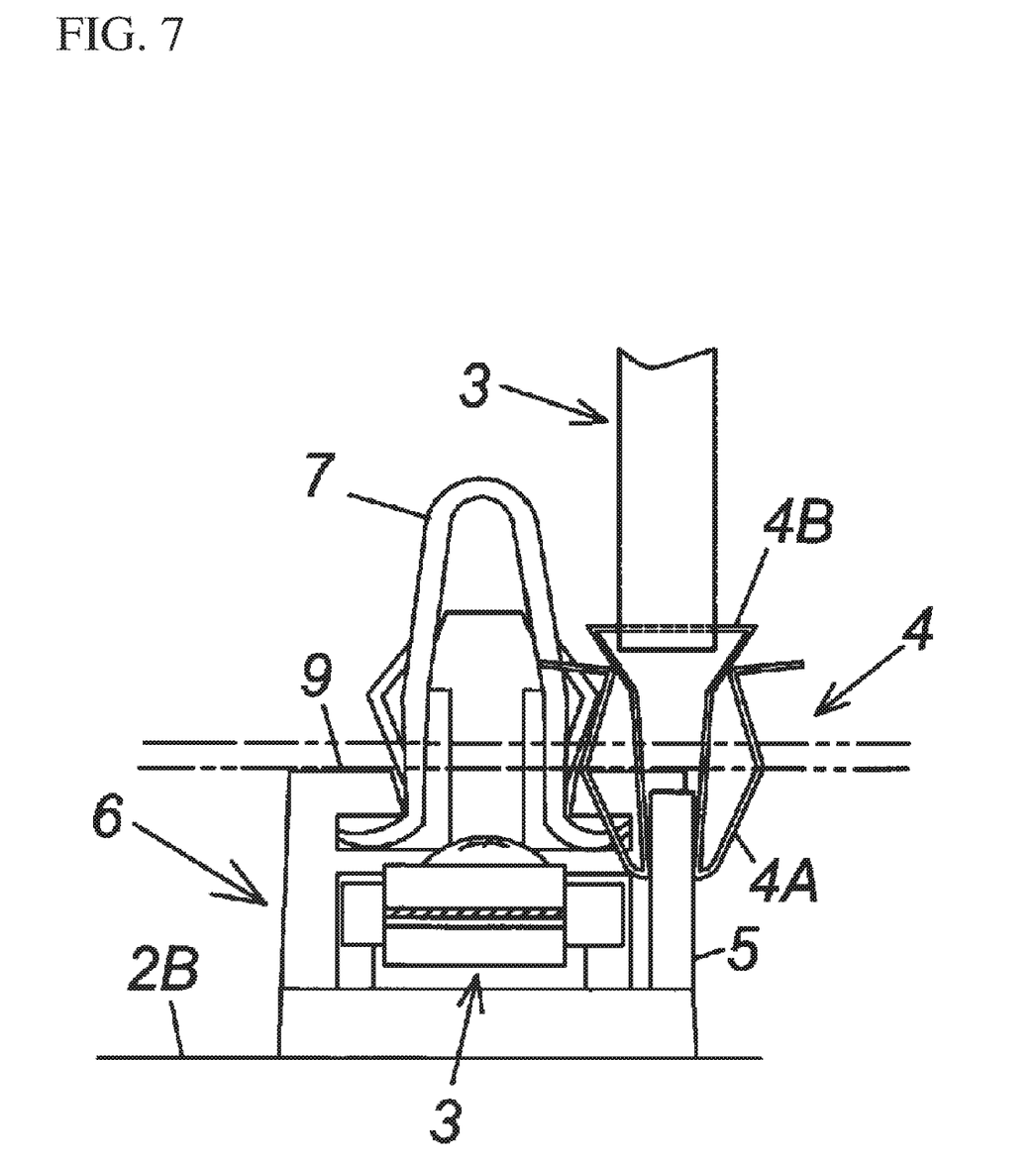
FIG. 7 is an illustration of a state where the metal clip is temporarily held.
Figure 8:
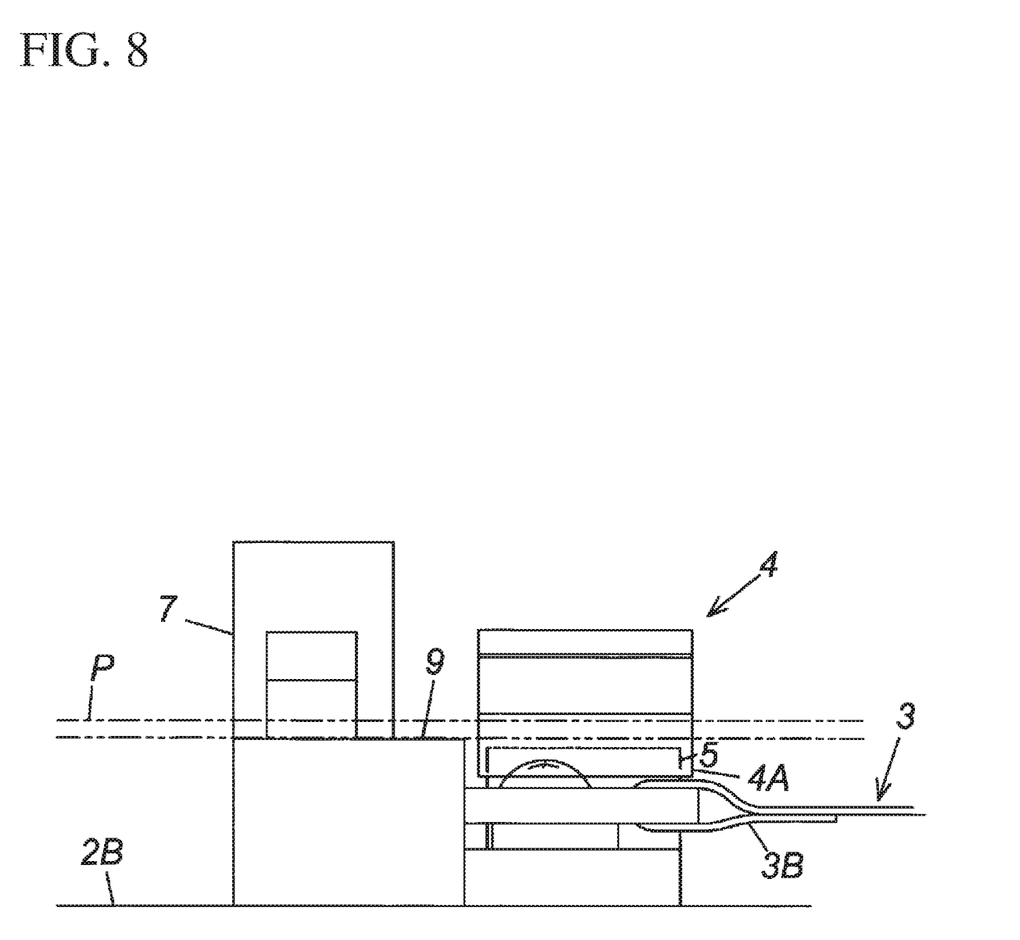
FIG. 8 is an illustration of a state where the metal clip is temporarily held.

As means for enabling anyone to easily find the above-described metal clip attaching mistake, the automobile interior trim 1 of FIG. 1 is set such that the proximal end 4B of the metal clip 4 is arranged at a position higher than the above-described contact portion 9 of the back surface 2A of the interior trim body as illustrated in FIG. 7 and FIG. 8 in a temporary holding state, i.e., in a state where the rib 5 is pinched by the pinching portions 4A of the metal clip 4. This setting may be implemented by adjusting a height dimension of the rib 5, adjusting a length dimension from the distal end 4A to the proximal end 4B of the metal clip 4, or adjusting both of the dimensions, for example.

In the case where the above-described setting is adopted, when a metal clip attaching mistake occurs in work of attaching the interior trim body 2 to the vehicle body panel P, the proximal end 4B of the metal clip 4 contacts against the vehicle body panel P before the contact portion 9 of the back surface 2A of the interior trim body does. Accordingly, the contact portion 9 of the back surface 2A of the interior trim body cannot contact against the vehicle body panel P, resulting in an attachment abnormal state where the interior trim body 2 unnecessarily floats from the vehicle body panel P. This attachment abnormal state is not removed even by strongly pressing the interior trim body 2 against the vehicle body panel P unless the temporary holding of the metal clip 4 is released. From this matter, a working person can easily find the metal clip attaching mistake.

In the automobile interior trim 1 of FIG. 1, the pinching portions 4A of the metal clip 4 are made of a well-known spring material, and are structured so as to pinch the rib 5 by spring force acting in a direction of pinching the rib 5 (specifically, a thickness direction of the rib). In such a pinching structure based on spring force, examples of a configuration considered as means for enhancing temporary holding force of the metal clip 4 on the rib 5 include a configuration (hereinafter, referred to as "first configuration") in which the rib 5 is formed thick, thereby widening a pinching width when the pinching portions 4A pinch the rib 5, and a configuration (hereinafter, referred to as "second configuration") in which a strong spring material is adopted as a raw material that forms the pinching portions 4A.

However, according to the first configuration, there is a disadvantage that a molding defect of the interior trim body 2 is likely to occur as in an example where when the interior trim body 2 and the rib 5 are molded of resin integrally with each other, forming the rib 5 too thick causes a resin sink mark to occur near a root of the rib 5, i.e., near a boundary between the rib 5 and the interior trim body 2, and a depression due to the sink mark appears on the designed surface 2A of the interior trim body 2. According to the second configuration, there is a disadvantage that the strong spring material is relatively expensive, and thus, entire cost of the automobile interior trim 1 is increased.

Figure 9A:
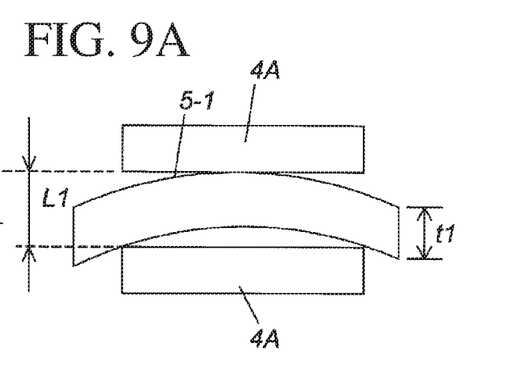
FIG. 9A is an illustration of a state where a rib having a shape curved in a width direction of the pinching portions of the metal clip is pinched by the pinching portions of the metal clip.
Figure 9B:
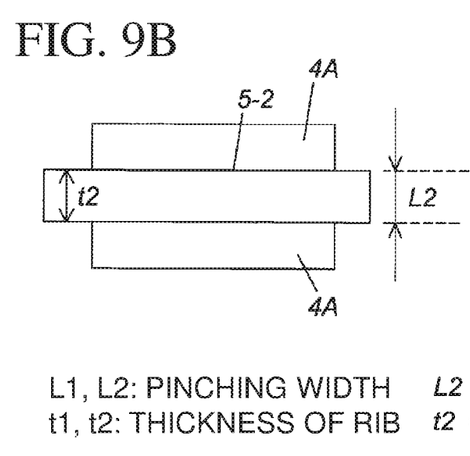
FIG. 9B is an illustration of a state where an un-curved rib is pinched by the pinching portions of the clip.

FIG. 9A is an illustration of a state where a rib (hereinafter, referred to as "temporary-holding-force reinforcement rib 5-1") having a shape curved in a width direction of the pinching portions of the metal clip is pinched by the pinching portions of the metal clip. FIG. 9B is an illustration of a state where an un-curved rib (hereinafter, referred to as "compared rib 5-2") is pinched by the pinching portions of the metal clip.

In the automobile interior trim 1 of FIG. 1, temporary holding force of the metal clip 4 is enhanced by a third configuration different from the above-described first and second configurations, specifically by the configuration in which the rib 5 has a shape curved in the width direction of the pinching portions 4A of the metal clip 4 as illustrated in FIG. 9A.

As understood from comparison between a pinching width L1 when the pinching portions 4A of the metal clip 4 pinch the temporary-holding-force reinforcement rib 5-1 and a pinching width L2 when the pinching portions 4A pinch the compared rib 5-2, in the case of adopting the temporary-holding-force reinforcement rib 5-1, the pinching width L2 is widened depending on a curved amount thereof. In other words, quasi-formation of a thick rib equivalent to a curved amount is made, thus enhancing temporary holding force of the metal clip 4.

As described above, the automobile interior trim 1 of FIG. 1 includes, as a specific constituent thereof, the rib 5 in the form of standing up from the back surface 2b of the interior trim body 2, and is configured such that this rib 5 functions as the means for temporarily holding the metal clip 4 by being pinched by the pinching portions 4A of the metal clip 4. For this reason, at the time of transporting or handling the automobile interior trim 1, the metal clip 4 is temporarily held near the rib 5, and thereby, flapping of the metal clip 4 can be prevented. Thus, damage of the designed surface 2A such as a scratch on the designed surface 2A caused by contacting of the metal clip 4 with the designed surface 2A can be effectively prevented at the time of transporting or handling the automobile interior trim 1.

The present invention is not limited to the above-described embodiment, and a person having ordinary knowledge in the present technical field can make more modifications within the technical idea of the present invention.

For example, the present invention may be applied to a rear pillar garnish well-known as an automobile interior trim.

REFERENCE SIGNS LIST

1 Automobile interior trim
2 Interior trim body
2A Designed surface of interior trim body
2B Back surface of interior trim body
3 Strap
4 Metal clip
4A Pinching portion
4B Proximal end of metal clip
5 Rib
6 Clip support base
7 Attachment clip
8 Clip attachment hole
9 Contact portion
P Vehicle body panel

The invention claimed is:

1. An automobile interior trim comprising:
   an interior trim body including a designed surface and a back surface thereof and attached to a vehicle body panel;
   a strap attached to the back surface of the interior trim body;
   a metal clip attached to a distal end of the strap; and
   a rib in a form of standing up from the back surface of the interior trim body,
   wherein a part included in the metal clip and positioned on a distal end side of the metal clip is formed as pinching portions capable of being opened and closed, and
   the rib functions as means for temporarily holding the metal clip by being pinched by the pinching portions of the metal clip.

2. The automobile interior trim according to claim 1, further comprising:
   a contact portion arranged at the back surface of the interior trim body, the contact portion configured to be contact against the vehicle body panel, and
   the automobile interior trim is set such that a proximal end of the metal clip is arranged at a position higher than the contact portion in a state of the temporary holding.

3. The automobile interior trim according to claim 2, wherein the rib is formed in a shape curved in a width direction of the pinching portions to function as means for enhancing temporary holding force of the metal clip on the rib.

4. The automobile interior trim according to claim 1, wherein the rib is formed in a shape curved in a width direction of the pinching portions to function as means for enhancing temporary holding force of the metal clip on the rib.

* * * * *